United States Patent [19]

Shiozawa et al.

[11] Patent Number: 5,357,097
[45] Date of Patent: Oct. 18, 1994

[54] METHOD AND APPARATUS FOR CONTROLLING ACOUSTO-OPTIC FILTER

[75] Inventors: Takahiro Shiozawa; Naoki Shimosaka, both of Tokyo, Japan

[73] Assignee: Nec Corporation, Tokyo, Japan

[21] Appl. No.: 981,319

[22] Filed: Nov. 25, 1992

[30] Foreign Application Priority Data

Nov. 25, 1991 [JP] Japan .................................. 3-308621
Dec. 17, 1991 [JP] Japan .................................. 3-353352

[51] Int. Cl.[5] .............................. G01J 1/32; G02F 1/11
[52] U.S. Cl. ..................................... 250/205; 359/286
[58] Field of Search ................. 250/205; 359/285-287

[56] References Cited

U.S. PATENT DOCUMENTS

| 4,201,455 | 5/1980 | Vadasz et al. | 359/286 |
| 4,614,116 | 9/1986 | Huston et al. | 359/286 |
| 4,629,879 | 12/1986 | Baldwin et al. | 250/205 |
| 5,033,827 | 7/1991 | Vezzoli et al. | 359/285 |
| 5,067,798 | 11/1991 | Tomoyasu | 359/286 |
| 5,105,304 | 4/1992 | Tanaka et al. | 359/285 |

OTHER PUBLICATIONS

D. A. Smith et al., "Polarization-Independent Acoustically-Tunable Optical Filter", ECOC '89 15th European Conference on Optical Communication—Post-Deadline Papers, vol. 3, pp. 70-73.
S. E. Harris et al., "Acousto-Optic Tunable Filter", Journal of the Optical Society of America, vol. 59, No. 6, Jun. 1969, pp. 744-747.
Amnon Yariv in "Optical Waves in Crystals", John Wiley & Sons, 1984, Chapter 10, pp. 366-404.
K. W. Cheung et al., "Simultaneous Five-wavelength Filtering at 2.2 nm Wavelength Separation Using an Integrated-Optic Acousto-Optic Tunable Filter with Subcarrier Detection", WeA17-3, 1989, pp. 312-315.

Primary Examiner—David C. Nelms
Assistant Examiner—S. B. Allen
Attorney, Agent, or Firm—Sughrue, Mion, Zinn, Macpeak & Seas

[57] ABSTRACT

An apparatus for controlling an acousto-optic filter includes a high-frequency oscillator, a beam intensity detector, a first and a second oscillator, and a first and a second controller. The high-frequency oscillator drives the acousto-optic filter and the frequency of the driving signal is finely modulated by oscillation frequency $f_0$ of the first oscillator. The detector detects an output signal beam intensity of the acousto-optic filter. An output of the detector is synchronously detected at the frequency $f_0$ and the frequency of the driving signal is controlled by the first controller so that the resultant detected output becomes zero. Similarly, the amplitude of the driving signal is finely modulated by the oscillation frequency $f_1$ of the second oscillator. The output of the detector is synchronously detected at the frequency $f_1$ and the amplitude of the driving signal is controlled by the second controller so that the resultant detected output becomes zero. The frequency $f_0$ of the first oscillator is different from that $f_1$ of the second oscillator. Thus, the transmittivity can be maximized and stable filter operation can be realized. The apparatus may further include another variable high-frequency oscillator or a variable low-frequency oscillator which supplies to the acousto-optic filter two or more high-frequency signals for varying transmission bandwidth of the acousto-optic filter.

9 Claims, 5 Drawing Sheets

METHOD AND APPARATUS FOR CONTROLLING ACOUSTO-OPTIC FILTER

BACKGROUND OF THE INVENTION

1. Field of the Invention

The present invention relates to controlling of an acousto-optic filter, and more particularly to a method and an apparatus for controlling a frequency and an amplitude of a high-frequency drive signal so as to maximize an output transmittivity for a transmission wavelength simultaneously with tuning the frequency of the high-frequency drive signal to an optical signal wavelength In the acousto-optic filter, and also to a method and an apparatus for adjusting the transmission bandwidth of an acousto-optic filter which selects light with a given wavelength from an input signal.

2. Description of the Related Art

Firstly, the description is presented in relation to the first aspect of the invention which relates to a method and an apparatus for controlling a frequency and an amplitude of a high-frequency signal (radio frequency signal) for driving an acousto-optic filter so as to maximize an output transmittivity of an optical signal.

The acousto-optic filter is a variable wavelength filter for filtering light with a wide variable wavelength range.

As an example of an acousto-optic filter, FIG. 1 shows a configuration of the acoustically-tunable optical filter disclosed in ECOC'89 15th European Conference on Optical Communication—Post-Deadline Papers, Volume 3, pages 70–73. As shown in FIG. 1, the acousto-optic filter is constituted by two, optical waveguides 106 formed by titanium diffusion on a substrate of lithium niobate ($LINbO_3$), a first TE-TM splitter 107, a second TE-TM splitter 108, an electrode 109 and an acoustic beam region 110. An optical signal inputted from a first input terminal 102 is split by the first TE-TM splitter 107 into a TE polarization wave and a TM polarization wave which advance through two optical waveguides, respectively, and meet together at the second TE-TM splitter 108 before being outputted from the first output terminal 104. In this case, when an electric signal of a certain frequency is inputted to the electrode 109, an optical signal of a wavelength corresponding to that certain frequency undergoes a TE-TM mode conversion due to acousto-optic effects to develop in the optical waveguides within the acoustic beam region 110. Consequently, only the optical signal of such wavelength is forwarded to the second output terminal 105 and the optical signal of any other wavelengths is forwarded to the first output terminal 104. Since the wavelength of the signal that is outputted from the second output terminal 105 can be changed by changing the frequency of the electric signal, it is possible to construct a variable wavelength filter using the first input terminal 102 and the second output terminal 105 as an input and an output, respectively.

A control system of a conventional acousto-optic filter which is used for such applications as a multiple wavelength communication is shown in FIG. 2 in a block diagram. An acousto-optic filter 201 receives an optical signal of multiple wavelengths. An output optical signal of the acousto-optic filter 201 is split by a beam splitter 203 and the intensity of the output signal beam is detected by a beam intensity detector 204. The acousto-optic filter 201 is driven by a high-frequency oscillator 202 with a variable frequency but the driving frequency thereof is frequency-modulated finely or in small adjustments to an oscillation frequency of an oscillator 205. An output of the beam intensity detector 204 is synchronously detected at the oscillation frequency of the oscillator 205 by a multiplier 206 and the frequency of the high-frequency oscillator 202 is controlled by a controller 207 so that the synchronous detector output becomes zero. Here, reference is made to characteristic graphs shown in FIGS. 5A and 5B for control principles of frequencies of the high-frequency signal that drives the acousto-optic filter. An input signal beam applied to the acousto-optic filter 201 is with multiple wavelengths so that, when the frequency of the high-frequency oscillator 202 is scanned, wavelength channels are successively selected, and the output signal beam intensity changes, for example, as shown in FIG. 5A. In this case, since the driving frequency of the high-frequency oscillator 202 is finely frequency-modulated to the oscillation frequency of the oscillator 205, the output of the synchronous detector at the oscillation frequency of the oscillator 205 by the multiplier 206 has differential characteristics as shown in FIG. 5B in relation to FIG. 5A so that, by using a control method such as proportional-plus-integral control (PI control), the frequency of the high-frequency oscillator 202 can be controlled, for example, at point A of FIG. 5B through the adder 208.

When the conventional technology described above is used, the transmission wavelength of the acousto-optic filter can be tuned to the input optical signal wavelength.

However, since the amplitude of the high-frequency to drive the acousto-optic filter is not controlled, the transmittivity of the optical signal is not optimized for the overall variable width of the acousto-optic filter.

The problems existing in the above described conventional technology is overcome by the present invention which provides a method and an apparatus for controlling the frequency and the amplitude of a high-frequency drive signal so as to maximize an output transmittivity for a transmission wavelength simultaneously with tuning the frequency of the high-frequency drive signal to an optical signal wavelength in the acousto-optic filter.

Now, the second part of the description of the related art given hereinafter relates to the second aspect of the invention which provides a method and an apparatus for adjusting a transmission bandwidth of the acousto-optic filter.

Conventionally, an acousto-optic filter has been in use as a means for selecting one wavelength from a signal with multiple wavelengths or as a means for eliminating spontaneous emission optical noise from the output of an optical amplifier. When the input optical signal is modulated, even if there are differences because the spectrum width differs for each wavelength channel or there are changes with time due to device characteristic fluctuations or modulation methods, it has not been possible to cope with these differences or changes since the filter transmission bandwidth is fixed for the device length at the time of design. For this reason, the acousto-optic filter transmission bandwidths to be set during the acousto-optic filter design must match the wavelength channel having the maximum spectrum width among all the wavelength channels used in the system and also the values of such widths must be values broad enough to compensate for differences that accompany the changes with time.

During wavelength multiplex transmission, the interval between wavelength channels must be set with the above mentioned unnecessarily broad transmission widths. This presents a problem which makes it difficult to realize high-density wavelength channels. Also, when the spontaneously emitted optical noise is to be removed from the output of an optical amplifier, there is a problem with increased noise because of the unnecessarily broad transmission widths. In relation to these problems, a method for changing the transmission bandwidth of an acousto-optic filter by using an external signal described by Amnon Yariv in "Optical Waves in Crystals" Chapter 10 (1984) is known as a method to adjust the power of a high-frequency signal inputted to the filter.

In the above method, when the high-frequency signal power applied to the acousto-optic filter is made small, crosstalk increases since the transmission width broadens and the sidelobe suppression ratio deteriorates if used as a wavelength selection filter and the noise corresponding to the sidelobes is not eliminated if used to eliminate spontaneous emission optical noise from the output of an optical amplifier.

The present invention overcomes the above problems existing in the conventional technology and provides a method and an apparatus for adjusting the transmission bandwidth of the acousto-optic filter without deteriorating the sidelobe suppression ratio.

SUMMARY OF THE INVENTION

An object of the invention, as a first aspect thereof, is to provide a method and an apparatus for controlling an acousto-optic filter to maximize the transmittivity of an optical signal.

The method, in which a signal beam with a desired wavelength is extracted from a plurality of signal beams having wavelengths different from one another, comprises the steps of detecting an output signal beam intensity of the acousto-optic filter and controlling simultaneously a frequency and an amplitude of a high-frequency signal that drives the acousto-optic filter so as to maximize the output signal beam intensity.

The apparatus for controlling an acousto-optic filter, comprises:
- a high-frequency oscillator in which oscillation frequency and amplitude are variable and which drives the acousto-optic filter;
- a beam intensity detector which detects intensity of an output signal beam from the acousto-optic filter;
- a first oscillator which finely modulates a frequency of the high-frequency signal that drives the acousto-optic filter;
- a first synchronous detector which synchronously detects an output of the beam intensity detector by an oscillation frequency of the first oscillator;
- a first controller which controls the frequency of the high-frequency optical signal by using an output of the first synchronous detector as an error signal;
- a second oscillator which finely modulates the amplitude of the high-frequency signal;
- a second synchronous detector which synchronously detects an output of the beam intensity detector by an oscillation frequency of the second oscillator; and
- a second controller which controls the amplitude of the high-frequency signal by using an output of the second synchronous detector as an error signal.

In the method described above, the intensity of the output signal beam from the acousto-optic filter is detected and the frequency and the amplitude of the high-frequency signal that drives the acousto-optic filter are simultaneously controlled so as to maximize such output signal beam intensity.

The transmission wavelength of the acousto-optic filter is determined by the frequency of the high-frequency signal that drives the acousto-optic filter. In this case, there is an optimum amplitude for the high-frequency signal that maximizes the transmittivity. In the method, since the frequency and the amplitude of the high-frequency signal that drives the acousto-optic filter are simultaneously controlled so as to maximize the output signal beam intensity, the frequency of the high-frequency signal is tuned to the signal beam wavelength, and the amplitude of the high-frequency signal is set to the optimum value so as to maximize the transmittivity.

In the apparatus described above, the frequency of the high-frequency signal that drives the acousto-optic filter is finely modulated, the output of the beam intensity detector which detects the output signal beam intensity of the acousto-optic filter is synchronously detected at the oscillation frequency of the first oscillator by the first synchronous detector and the frequency of the high-frequency signal that drives the acousto-optic filter is controlled by the first controller with such synchronously detected output used as an error signal, whereby the frequency of the high-frequency signal can be tuned to the signal beam wavelength. Furthermore, the amplitude of the high-frequency signal that drives the acousto-optic filter is finely modulated by the second oscillator, the output of the beam intensity detector that detects the output signal beam intensity of the acousto-optic filter is synchronously detected at the oscillation frequency of the second oscillator by the second synchronous detector, and the amplitude of the high-frequency signal that drives the acousto-optic filter is controlled by the second controller with such synchronously detected output used as an error signal, whereby the amplitude of the high-frequency signal can be controlled to the optimum value that maximizes the transmittivity of the acousto-optic filter. In this case, if the oscillation frequency of the first oscillator is set to an oscillation frequency different from the oscillation frequency of the second oscillator, the output of the first synchronous detector is not affected by the fine modulation of the amplitude of the high-frequency signal that drives the acousto-optic filter and the output of the second synchronous detector is not affected by the fine modulation of the frequency of the high-frequency signal that drives the acousto-optic filter.

The second aspect of the invention provides a method for changing a transmission bandwidth of an acousto-optic filter whereby a transmission center wavelength (or frequency) is changed when a change occurs in an external high-frequency signal, characterized in that the acousto-optic filter is inputted simultaneously with two or more high frequency signals having a frequency difference close to a value corresponding to the transmission width that is obtainable when a high frequency signal of a single frequency is inputted to the acousto-optic filter and, by changing such frequency difference, the transmission bandwidth can be adjusted.

The second aspect of the invention also provides an apparatus which comprises a high-frequency oscillator which oscillates at a high-frequency for driving an acousto-optic filter whose transmission bandwidth is to be adjusted; a variable frequency oscillator which oscillates at a frequency equivalent to a frequency difference neighboring a value corresponding to the transmission width that is obtainable when a high frequency signal of a single frequency is inputted to the acousto-optic filter; and a multiplier which multiplies an output of the high-frequency oscillator and an output of the variable frequency oscillator, whereby the acousto-optic filter is driven by the output of the multiplier and the transmission bandwidth of the acousto-optic filter is changed.

According to the arrangement of the second aspect of the invention, the high-frequency signals inputted to the acousto-optic filter are multiple frequency signals formed from two or more frequencies having a frequency difference sufficiently close to that corresponding to the acousto-optic filter transmission bandwidth, so the transmission characteristic obtained is the superposition of the corresponding transmission characteristics and the transmission bandwidth can essentially be broadened. With this type of configuration, by adjusting a single frequency in the multiple frequencies, the center transmission wavelength spacing of the combined acousto-optic filter transmission characteristics can be changed, and the transmission bandwidth after combining can be adjusted.

Also, with the second aspect of the invention, the multiple frequency signal is the product of a high-frequency signal outputted from a high-frequency oscillator and a low-frequency signal outputted from a variable frequency oscillator. This reduces the number of high-frequency oscillators. The high frequency signal power which is lowered due to the separation into two high-frequency signals resulting from the product of the high-frequency signal and the low-frequency signal can be compensated by changing an output signal power from at least either the high-frequency oscillator or the variable frequency oscillator and this in turn prevents a decrease in the peak transmittivity of the transmission characteristics.

BRIEF DESCRIPTION OF THE DRAWINGS

The above and other objects, features and advantages of the present invention will be apparent from the following description of preferred embodiments of the invention explained with reference to the accompanying drawings, in which.

DESCRIPTION OF THE PREFERRED EMBODIMENTS

Now, preferred embodiments of the invention are described with reference to the appended drawings.

The first part of the description is directed to the first aspect of the invention which relates to a method and an apparatus for controlling the acousto-optic filter to maximize the transmittivity of an optical signal.

Figure 1:
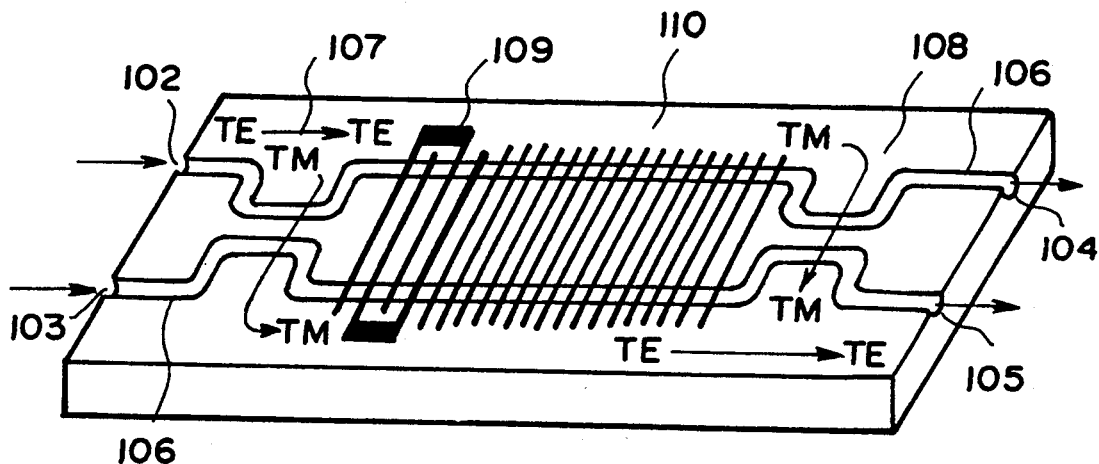
FIG. 1 is a diagram showing a conventional typical acousto-optic filter.
Figure 2:
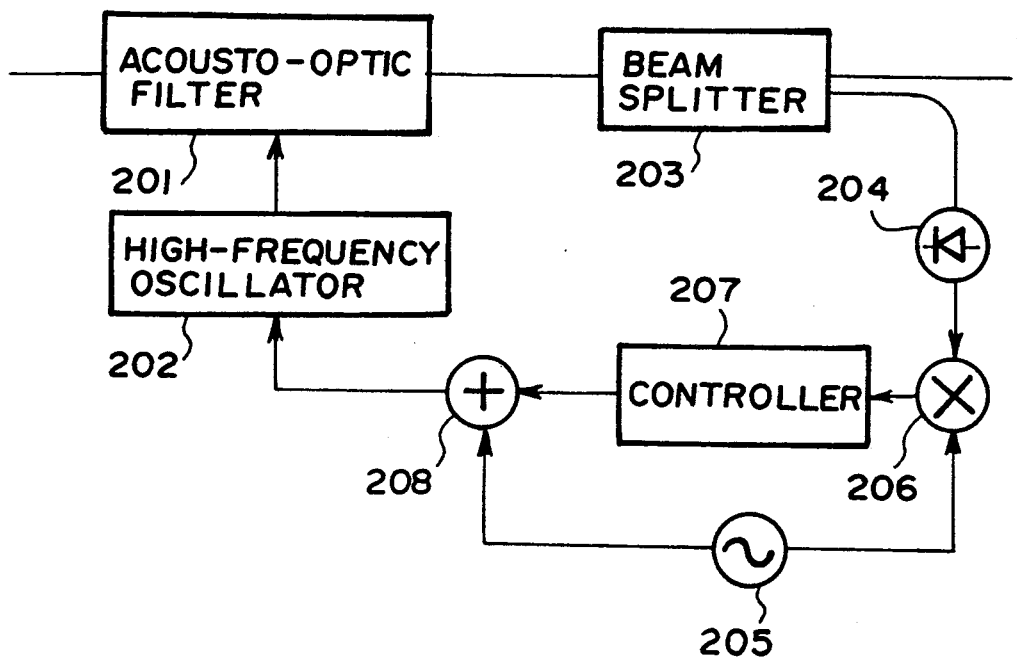
FIG. 2 is a block diagram showing a conventional apparatus for controlling the acousto-optic filter.
Figure 3:
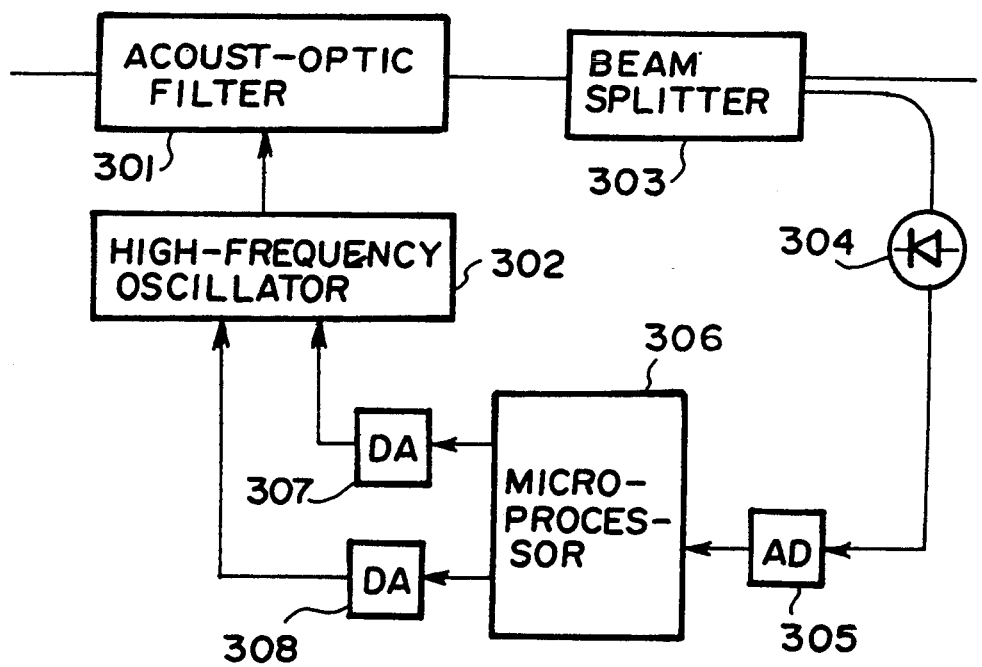
FIG. 3 is a block diagram showing an apparatus for controlling the acousto-optic filter of a first embodiment according to the present invention.

FIG. 3 is a block diagram showing a first embodiment of the first aspect of the invention. An optical signal made up of multiple wavelengths (i.e., wavelength multiplex signal) is inputted to an acousto-optic filter 301. A beam splitter 303 splits the output of the acousto-optic filter 301, and directs part of the output to a beam intensity detector 304 which detects the intensity of the output signal beam. A high-frequency oscillator 302 with variable frequency and amplitude drives the acousto-optic filter 301. An analog-to-digital (AD) converter 305 converts the output of the beam intensity detector 304 and inputs it to a microprocessor 306. The high-frequency signal that drives the acousto-optic filter 301 is controlled by the microprocessor 306 through a digital-to-analog (DA) converter 307. Likewise, the amplitude of the high-frequency signal is controlled by the microprocessor 306 through a digital-to-analog (DA) converter 308.

Figure 5A:
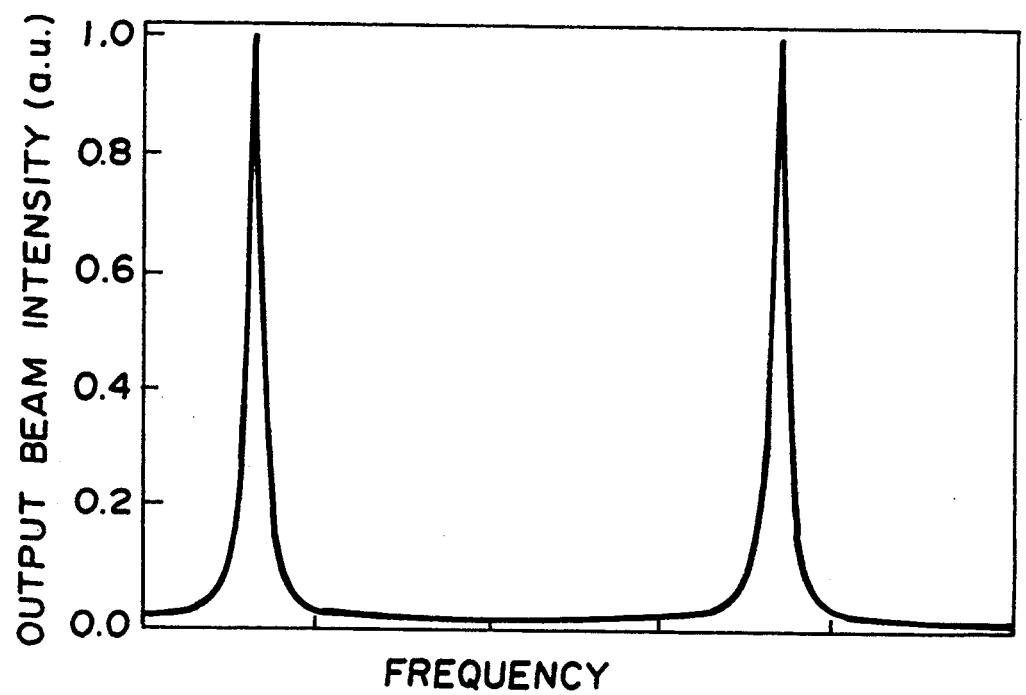
FIGS. 5A and 5B are characteristic graphs for explaining the principle of controlling the high-frequency signal which drives the acousto-optic filter.
Figure 5B:
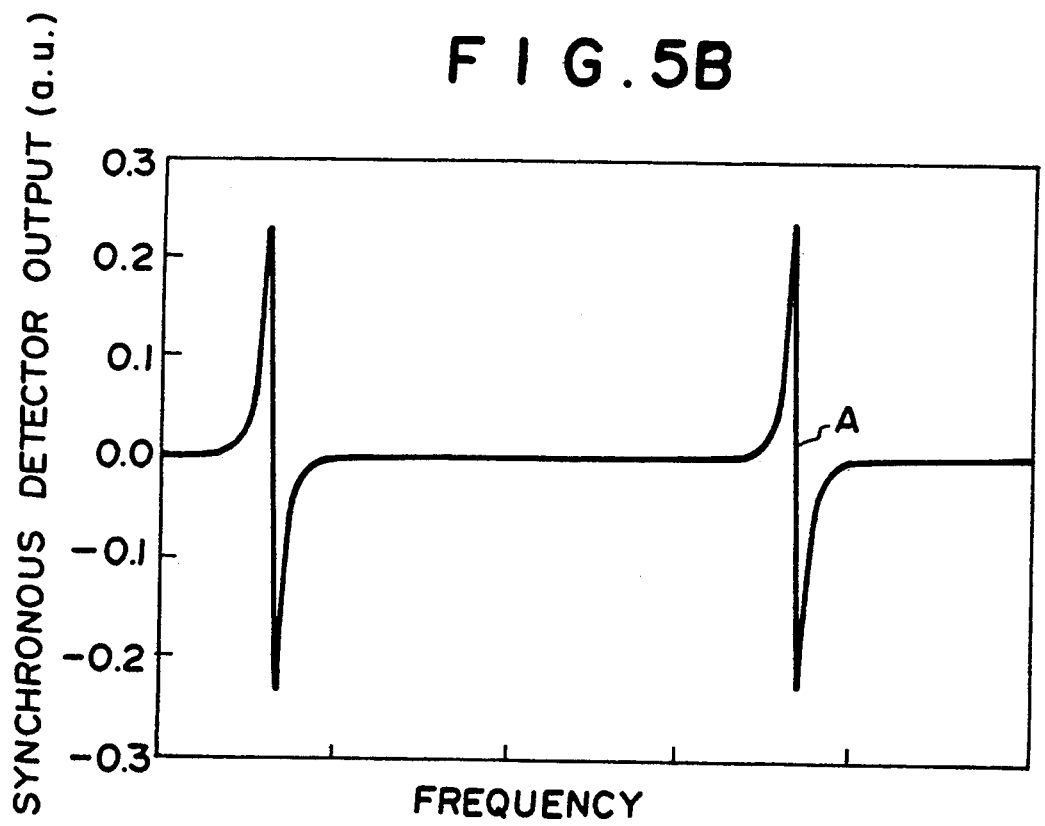
Figure 6A:
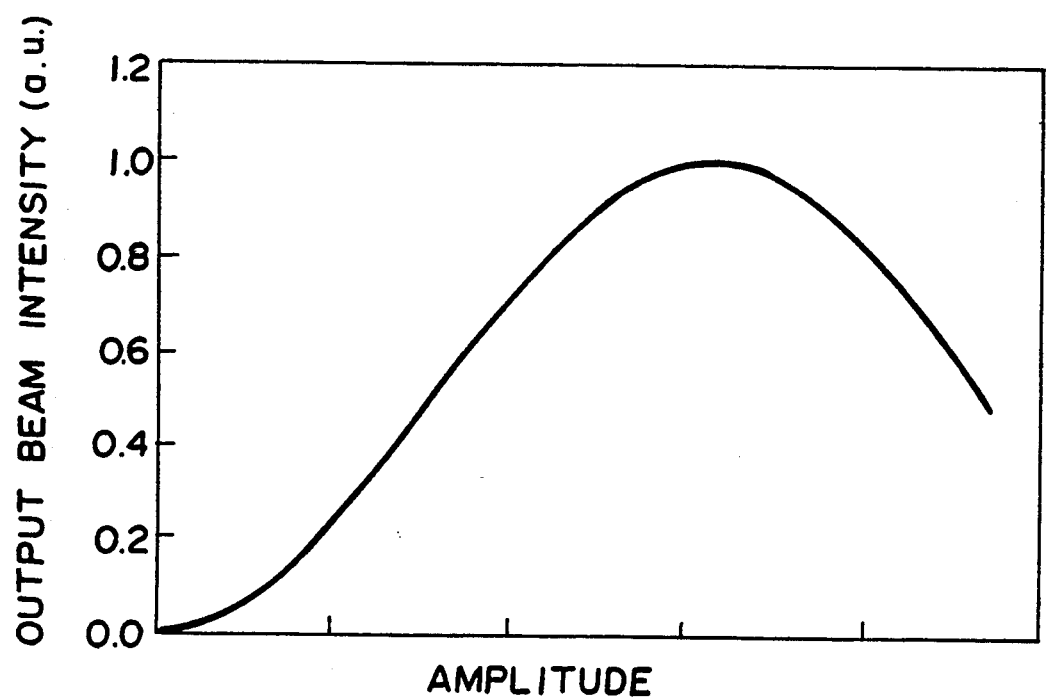
FIGS. 6A and 6B are characteristic graphs for explaining the principle of controlling the amplitude of the high frequency signal which drives the acousto-optic filter.

The microprocessor 306 causes the frequency or the amplitude of the high-frequency signal that drives the acousto-optic filter 301 to change in small steps through the digital-to-analog (DA) converter 307 or the digital-to-analog (DA) converter 308, and the output beam intensity before and after the change is detected through the beam intensity detector 304 and the analog-to-digital (AD) converter 305. Correspondingly to the changing of the frequency of the high-frequency signal that drives the acousto-optic filter, the output signal beam intensity of the acousto-optic filter changes as shown in FIG. 5A and, correspondingly to the changing of the amplitude of the high-frequency signal that drives the acousto-optic filter, the output signal beam intensity changes as shown in FIG. 6A, wherein both have a maximum value. Thus, by using as data the output signal beam intensity before and after the frequency or the amplitude of the high-frequency signal is changed in small steps and by making use of an algorithm such as a steepest descent method, the microprocessor 306 can control the frequency and the amplitude of the high-frequency signal so as to maximize the output signal beam intensity through the digital-to-analog (DA) Converter 307 and the digital-to-analog (DA) converter 308, respectively.

Figure 4:
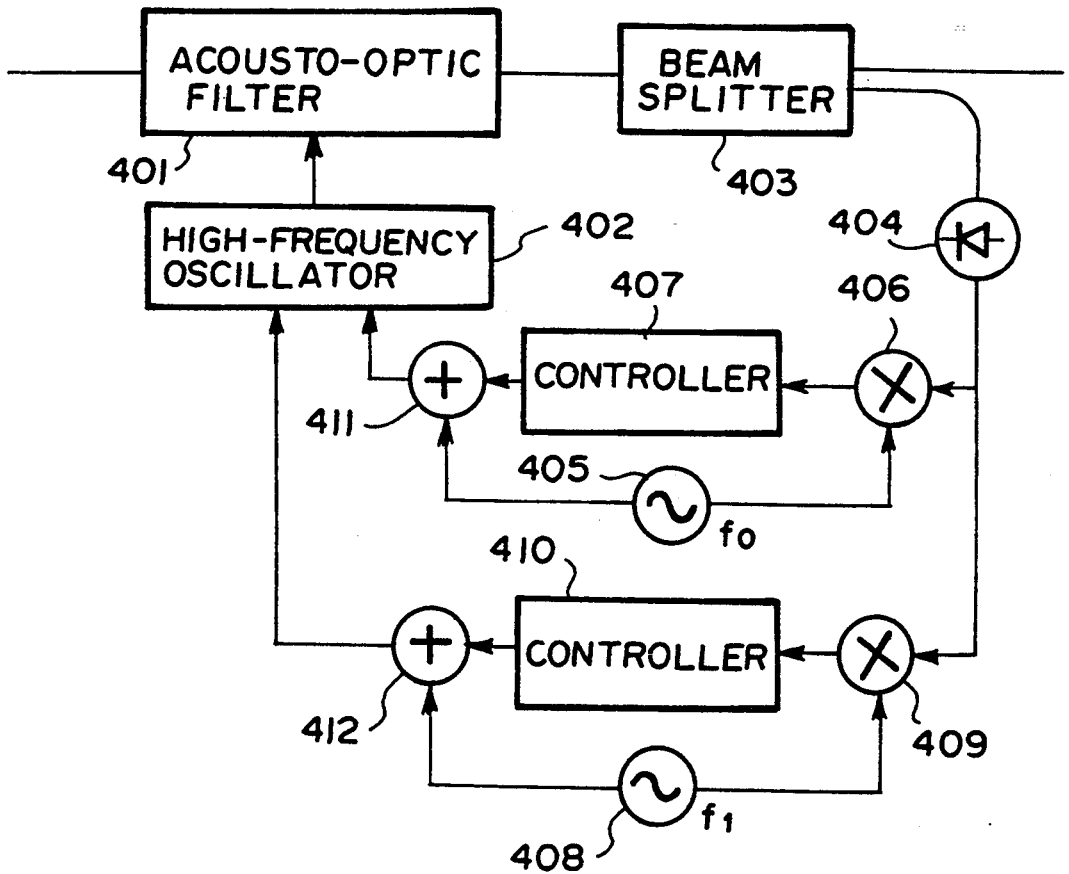
FIG. 4 is a block diagram showing an apparatus for controlling the acousto-optic filter of a second embodiment according to the present invention.

FIG. 4 is a block diagram showing a second embodiment according to the first aspect of the invention. A wavelength multiplex signal is inputted to an acousto-optic filter 401. A beam splitter 403 splits the output of the acousto-optic filter 401, and directs the split output to a beam intensity detector 404 which detects the output signal beam intensity. A high-frequency oscillator 402 with variable frequency and amplitude drives the acousto-optic filter 401. The drive frequency is finely frequency-modulated to the oscillation frequency $f_0$ of an oscillator 405. The output of the beam intensity detector 404 is synchronously detected at the oscillation frequency of the oscillator 405 by a multiplier 406, and the frequency of the high-frequency oscillator 402 is controlled by a controller 407 so as to cause the output of the synchronous detector to become zero. Likewise, the amplitude of the high-frequency signal that drives the acousto-optic filter 401 is finely amplitude-modulated to the oscillation frequency $f_1$ of an oscillator 408. The output of the beam intensity detector 404 is synchronously detected at the oscillation frequency $f_1$ of the oscillator 408 by a multiplier 409, and the amplitude of the high-frequency oscillator 402 is controlled by a controller 410 so as to cause the output of the synchronous detector to become zero.

Figure 6B:
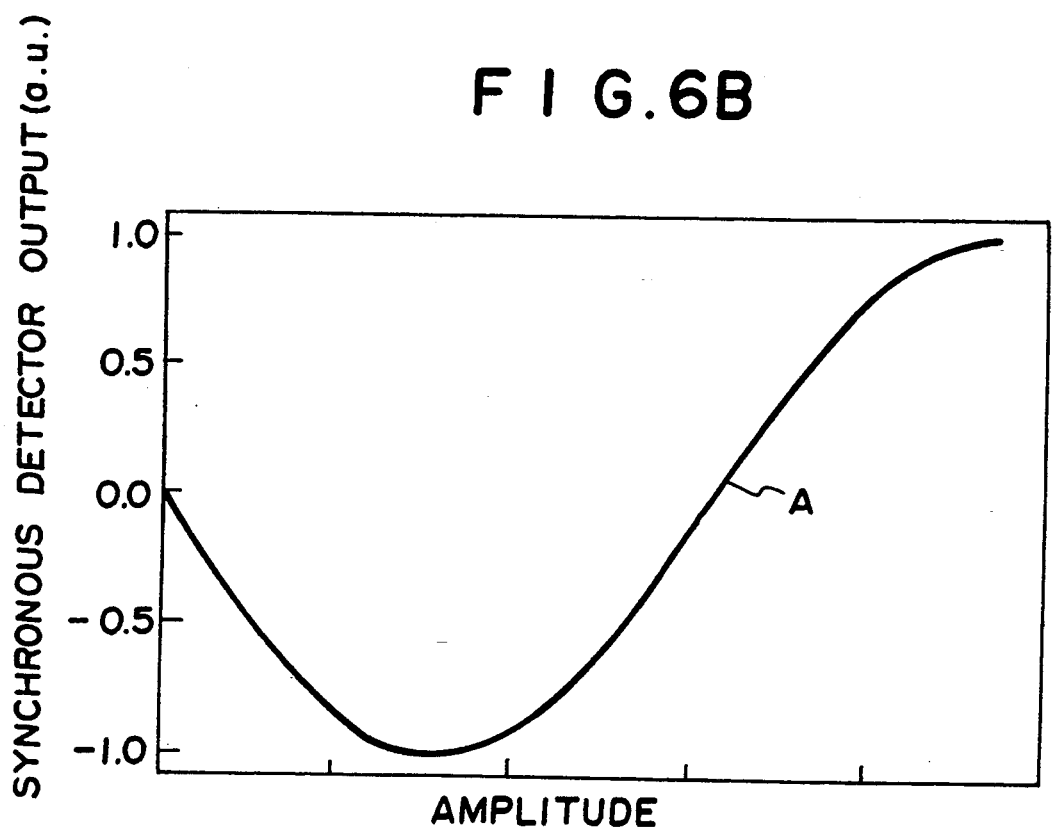

The control principle for the frequency of the high-frequency oscillator 402 that drives the acousto-optic filter 401 is the same as that explained for the conventional example. FIGS. 6A and 6B show characteristic graphs to explain tile control principle for the amplitude of the high-frequency signal that drives the acousto-optic filter. When the amplitude of the high-frequency oscillator 402 that drives the acousto-optic filter 401 is scanned, tile output signal beam intensity (the transmittivity) varies as shown in FIG. 6A. In this case, since the amplitude of the high-frequency oscillator 402 is finely frequency-modulated to the oscillation frequency $f_1$ of the oscillator 408, the synchronous detector output at the oscillation frequency $f_1$ of the oscillator 408 by the multiplier 409 has differential characteristics as shown in FIG. 6B in relation to FIG. 6A so that, by using a control method such as proportional-plus-integral control (PI control), the frequency of the high-frequency oscillator 402 can be controlled, for example, at point A of FIG. 6B through the adder 412. If the oscillation frequency $f_0$ of the oscillator 405 is set to an oscillation frequency different from the oscillation frequency $f_1$ of the oscillator 408, the output of the multiplier 406 being used as the synchronous detector is not affected by the fine modulation of the amplitude of the high-frequency signal that drives the acousto-optic filter 401 and the output of the multiplier 409 being used as the synchronous detector is not affected by the fine modulation of the frequency of the high-frequency signal that drives the acousto-optic filter 401.

The first aspect of the invention has been described with reference to the embodiments, but the invention is not limited to these embodiments. For example, in the embodiments, the beam splitter is used in detecting the intensity of the output signal beam from the acousto-optic filter but it is possible to detect the output signal beam intensity by means of a signal receiving detector without using the beam splitter. Also, an electronic circuit other than a multiplier can be used as the synchronous detector.

In the method of the invention described above, since the frequency and the amplitude of the high-frequency signal that drives the acousto-optic filter are simultaneously controlled so as to maximize the output signal beam intensity of the acousto-optic filter, the frequency of the high-frequency signal is tuned to the optical signal wavelength and the amplitude of the high-frequency signal is set to the optimum value for maximizing the transmittivity. In this way, stable optical filter operation that is not affected by such factors as changes in the signal beam wavelength or changes with time in characteristics of the acousto-optical filter can be realized.

The apparatus of the invention described above realizes the method of the invention in a simple manner with a circuit having such components as the oscillators, synchronous detectors and controllers.

Now, the second part of the description herein is directed to the second aspect of the invention which relates to the adjustment of the transmission bandwidth of all acousto-optic filter.

Figure 7:
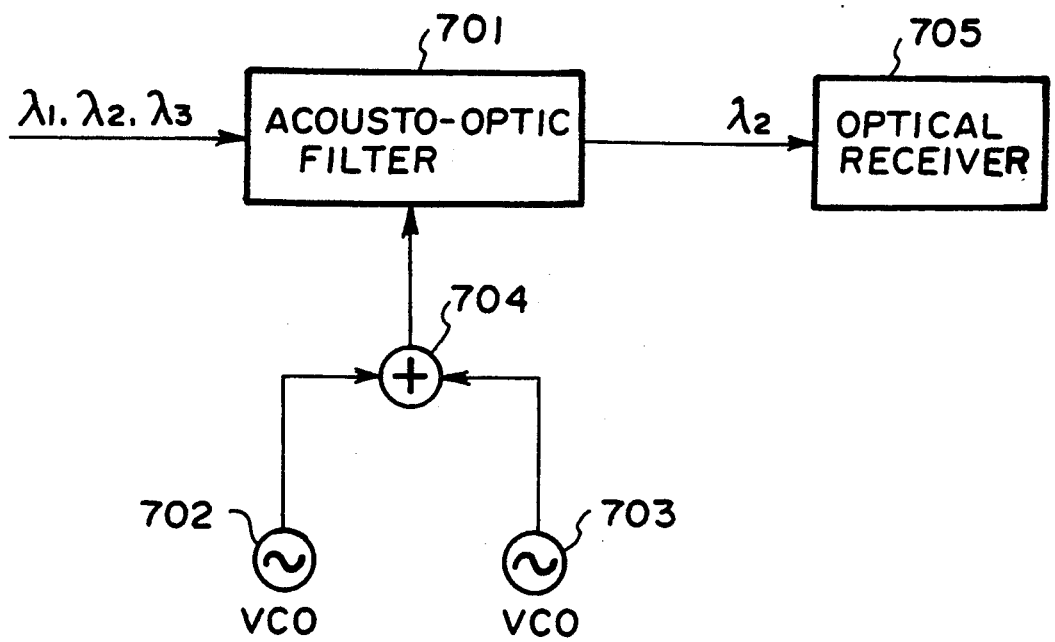
FIG. 7 is a block diagram showing an apparatus for controlling the acousto-optic filter of a third embodiment according to the present invention.

FIG. 7 shows a first embodiment according to the second aspect of the invention.

An acousto-optic filter 701 whose transmission bandwidth is to be adjusted has a wavelength multiplex input comprised of three 1.5 μm band optical signals (characterized by wavelengths λ1, λ2 and λ3). The optical signals λ1, λ2 and λ3 are 1.2 Gb/s random patterns generated by means of direct strength modulation of a semiconductor laser. There are first and second voltage controlled oscillators (VCO) 702 and 703 which serve as a high-frequency signal generating source for driving the acousto-optic filter 701 and which can be tuned to have an oscillation frequency of 170~180 MHz. The outputs of both the oscillators 702 and 703 are added by an adder 704 and inputted to the acousto-optic filter 701.

The operational principle and characteristics of an acousto-optic tunable filter is discussed by S. E. Harris et al in Journal of the Optical Society of America, Volume 59, Number 6 (published June 1969), pages 744–747.

For the acousto-optic filter 701 to select an optical signal λ2 from the optical signals λ1, λ2 and λ3, the frequency of the first oscillator VCO 702 is set to $f_2$ (170 MHz $\leq f_2 \leq$ 180 MHz), and the second oscillator VCO 703 is set to $f_2 + \Delta f$, where $\Delta f$ is about 1 MHz. An optical signal receiver 705 is fine-tuned for the most suitable conditions to receive optical signal λ2.

Figure 8:
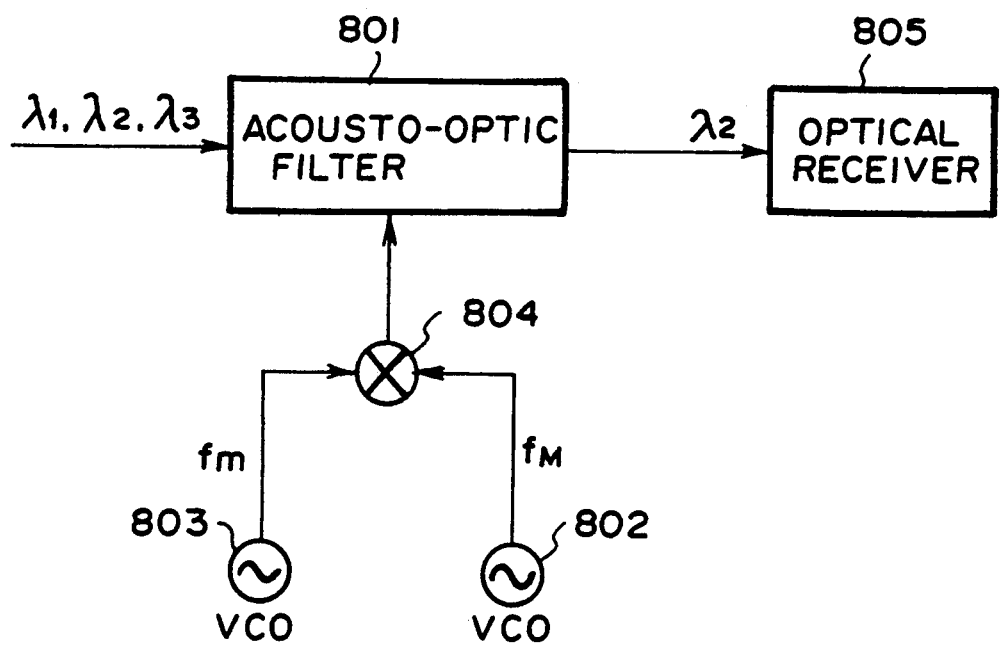
FIG. 8 is a block diagram showing an apparatus for controlling the acousto-optic filter of a fourth embodiment according to the present invention.

FIG. 8 shows a second embodiment of the second aspect of the invention. The wavelength multiplex optical signal inputted to the acousto-optic filter 801 is the same as in the first embodiment of the second aspect of the invention. In this embodiment, a first voltage controlled oscillator 802 oscillates in the 170~180 MHz high-frequency range, and a second voltage controlled oscillator VCO 803 oscillates in the 100 KHz~2 MHz low-frequency range. The oscillation frequencies of the oscillators 802 and 803 are assumed as $f_M$ and $F_m$, respectively, and they are multiplied together by a multiplier 804 giving two frequency signals $f_M+f_m$ and $f_M-f_m$. The output of the first oscillator VCO 802 can be adjusted by an external signal.

As in the first embodiment, to select λ2 from the three inputs λ1, λ2 and λ3, firstly, the oscillation frequency $f_M$ is set to $f_2$ and then the oscillation frequency $f_m$ is set to give the best receiving conditions for the optical signal receiver 805.

In the second embodiment, the wavelength channel to be selected is decided by the output of voltage controlled oscillator 802, the transmission bandwidth is adjusted by the output of voltage controlled oscillator 803 and, because both the voltage controlled oscillators 802 and 803 are used for their respective purposes, the overall control becomes somewhat simpler when compared with the first embodiment.

Since the transmission characteristics are obtained by the superposition of single frequency signals which takes place when the acousto-optic filter is driven by a single frequency signal, the transmission bandwidth can be adjusted without deteriorating the sidelobe suppression ratio unlike the case in which the transmission characteristics are changed by decreasing a single frequency power.

In both the first and second embodiments explained above, two high-frequency signals are applied to the acousto-optic filter, but this number can be increased and the entire transmission characteristic profile can be adjusted.

As described above, by using the present invention, the transmission bandwidth of an acousto-optic filter can be adjusted without deteriorating the sidelobe suppression ratio.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A method for controlling an acousto-optic filter in which a signal beam with a desired wavelength is extracted from a wavelength multiplex signal, said method comprising the steps of:
    detecting intensity of an output signal beam from the acousto-optic filter; and
    variably controlling simultaneously a frequency and an amplitude of a high-frequency signal that drives said acousto-optic filter to maximize the intensity of said output signal beam.

2. An apparatus for controlling an acousto-optic filter, comprising:
    a high-frequency oscillator in which oscillation frequency and amplitude are variable and which drives the acousto-optic filter;
    a beam intensity detector which detects intensity of an output signal beam from said acousto-optic filter;
    an analog-to-digital converter which converts an output of said beam intensity detector to a digital signal;
    a microprocessor which receives the digital signal from said analog-to-digital converter;
    a first digital-to-analog converter through which a frequency of the high-frequency signal that drives said acousto-optic filter is controlled by said microprocessor; and
    a second digital-to-analog converter through which an amplitude of the high-frequency signal is controlled by said microprocessor.

3. An apparatus for controlling an acousto-optic filter, comprising:
    a high-frequency oscillator in which oscillation frequency and amplitude are variable and which drives the acousto-optic filter;
    a beam intensity detector which detects intensity of an output signal beam from said acousto-optic filter;
    a first oscillator which finely modulates a frequency of a high-frequency signal that drives said acousto-optic filter;
    a first synchronous detector which synchronously detects an output of said beam intensity detector by an oscillation frequency of said first oscillator;
    a first controller which controls the frequency of said high-frequency signal by using an output of said first synchronous detector as an error signal;
    a second oscillator which finely modulates an amplitude of said high-frequency signal;
    a second synchronous detector which synchronously detects the output of said beam intensity detector by an oscillation frequency of said second oscillator; and
    a second controller which controls the amplitude of said high-frequency signal by using an output of said second synchronous detector as an error signal.

4. An apparatus for controlling an acousto-optic filter according to claim 3, in which the oscillation frequency of said first oscillator is different from the oscillation frequency of said second oscillator.

5. A method for changing a transmission bandwidth of an acousto-optic filter in which a transmission center wavelength is changed when a change occurs in an external high-frequency signal, said method comprising the steps of:
    inputting to said acousto-optic filter simultaneously at least two high frequency signals having a frequency difference close to a value corresponding to a transmission width that is obtainable when a high frequency signal of a single frequency is input to the acousto-optic filter; and
    changing such frequency difference to adjust said transmission bandwidth of the acousto-optic filter.

6. An apparatus for changing a transmission bandwidth of an acousto-optic filter, comprising:
    a first variable high-frequency oscillator which oscillates at a first high-frequency for driving the acousto-optic filter whose transmission bandwidth is to be adjusted;
    a second variable high-frequency oscillator which oscillates at a second high-frequency which is different from said first high-frequency by a frequency neighboring a value corresponding to a transmission width that is obtainable when a high frequency signal of a single frequency is inputted to the acousto-optic filter; and
    an adder which adds an output of said first variable high-frequency oscillator and an output of said second variable high-frequency oscillator, whereby the acousto-optic filter is driven by an output of the adder and the transmission bandwidth of the acousto-optic filter is adjusted.

7. An apparatus for changing a transmission bandwidth of an acousto-optic filter, comprising:
    a high-frequency oscillator which oscillates at a high-frequency that drives the acousto-optic filter whose transmission bandwidth is to be adjusted;
    a variable low-frequency oscillator which oscillates at a low-frequency equivalent to a frequency difference neighboring a value corresponding to a transmission width that is obtainable when a high frequency signal of a single frequency is inputted to said acousto-optic filter; and
    a multiplier which multiplies an output of said high-frequency oscillator and an output of said variable low-frequency oscillator, whereby said acousto-optic filter is driven by an output of said multiplier and the transmission bandwidth of said acousto-optic filter is adjusted.

8. An apparatus for changing a transmission bandwidth of an acousto-optic filter according to claim 6, in which an output signal power of at least one of said first and second variable high-frequency oscillators is variable.

9. An apparatus for changing a transmission bandwidth of an acousto-optic filter according to claim 7, in which an output signal power of at least one of said high-frequency oscillator and said variable low-frequency oscillator is variable.

* * * * *